United States Patent [19]

Ledford et al.

[11] Patent Number: 5,592,520
[45] Date of Patent: Jan. 7, 1997

[54] LATCH HANDLE FOR A CONTROL ROAD IN A NUCLEAR REACTOR

[75] Inventors: Kevin L. Ledford; Jeffrey A. Wilson, both of Wilmington, N.C.

[73] Assignee: General Electric Company, Schenectady, N.Y.

[21] Appl. No.: 520,880

[22] Filed: Aug. 30, 1995

[51] Int. Cl.⁶ .................................................... G21C 7/10
[52] U.S. Cl. ........................................ 376/233; 376/327
[58] Field of Search .................................. 376/327, 229, 376/230, 233, 228

[56] References Cited

U.S. PATENT DOCUMENTS 4,462,957  7/1984  Fukui et al. ............................ 376/327

FOREIGN PATENT DOCUMENTS 2194495  8/1987  Japan ...................................... 376/327

Primary Examiner—Harvey E. Behrend
Attorney, Agent, or Firm—Nixon & Vanderhye

[57] ABSTRACT

A window in the control rod for a nuclear reactor has flanges along its opposite sides. A latch handle has slots along its opposite sides. The latch handle is sized and configured such that in a first angular orientation, the latch handle may be received within the plane and peripheral confines of the window and, upon rotation of the latch handle through 90° into a second orientation, engages the slotted sides of the latch handle with the flanges of the window to capture the latch handle within the window while simultaneously enabling linear vertical movement of the latch handle relative to the window. The latch handle is then attached to a shaft for operating a coupling mechanism between the control rod and the control rod drive.

19 Claims, 3 Drawing Sheets

LATCH HANDLE FOR A CONTROL ROAD IN A NUCLEAR REACTOR

TECHNICAL FIELD

The present invention relates to a latch handle for use in a control rod in a nuclear reactor and particularly relates to a latch handle which may be readily and easily installed in the control rod and which does not require any welding, machining or additional parts for retention by the control rod and service to release the control rod drive.

BACKGROUND

As well known, control rods in nuclear reactors form dual functions of power distribution shaping and reactivity control. The rods enter from the bottom of the reactor and are typically connected to bottom mounted, hydraulically actuated drive mechanisms which allow either axial positioning for reactivity regulation or rapid scram insertion. The control rod to control rod drive connection permits each control rod to be attached and detached from its drive during an outage, for example, for refueling, without disturbing the remainder of the control system for the control rod.

The control rods are generally cruciform in cross-sectional shape with each blade of the rod containing tubes filled with boron carbide. The bottom of the control rod tube includes rollers for guidance of the rod during insertion and withdrawal as well as a velocity limiter. Each control rod when inserted into the core of the nuclear reactor has a fuel bundle in each of its quadrants.

Each control rod typically includes at its lower end below the velocity limiter a coupling socket and a lock plug. The lock plug is mounted on an actuating shaft which passes upwardly coaxially along the control rod to a window in which is mounted a latch handle connected to the shaft. The coupling socket and lock plug are releasably attached to a coupling spud on the control rod drive by operation of the latch handle. Thus, the lock plug and socket receive the coupling spud and lock the control rod to the control rod drive. During an outage, when it is desirable to remove the control rod while leaving the control rod drive intact, and after removal of the fuel bundles, the latch handle is displaced upwardly displacing the lock plug from its locked condition with respect to the socket and coupling spud whereby the control rod is released from the control rod drive and may be removed.

Conventional latch handles for control rods have laterally projecting tongues which engage in slots formed along side edges of the window of the control rod. Typically, these slots require either four strips which are welded in place to the control rod or two slots machined into the edges of a thin plate with an overlying strip to capture the latch handle. Welding of strips to the control rod is necessary in these prior art handles to capture the handle in the control rod. Substantial labor is involved in welding the necessary strips to form the slots and, in general, to locate the latch in the control rod window.

DISCLOSURE OF THE INVENTION

According to the present invention, there is provided a latch handle which performs the same function as latch handles of the prior art, i.e., to releasably lock the control rod and the control rod drive to one another yet which does not require welding or substantial labor to locate the handle in the window of the control rod. To accomplish this, the window in the control rod is formed with flanges projecting from its opposite sides. The latch handle is generally rectilinear in configuration with opposite sides defining slots for receiving the flanges along the opposite sides of the window. The latch handle, however, is sized and configured so that, in a first rotational orientation, the latch handle lies within the peripheral confines of the window and, upon rotation of the latch handle into a second angular orientation, the slots of the latch handle receive the flanges of the window sides. The latch handle in its second orientation is attached to the shaft mounting the lock plug. Hence, by sliding the latch handle in a vertical direction, the lock plug cooperates with the socket and spud to detach or attach the control rod and control rod drive relative to one another. It will be appreciated that the slots on the latch handle and the flanges on the window can be reversed with the flanges lying on the latch handle and the slots along the sides of the window.

In a preferred embodiment according to the present invention, there is provided a control rod for a nuclear reactor comprising a control rod body having a plurality of blades projecting generally at right angles to one another, the body having a window defined by a plurality of generally linearly extending sides, a latch handle for connection to the control rod body and location in the window, the latch handle having a plurality of linearly extending sides, at least a pair of sides of one of the window and the latch handle having retaining slots and at least a pair of sides of another of the window and the latch handle having flanges for engaging in the slots, the sides of the latch handle and the window being configured so that the latch handle, in a first rotational orientation relative to the window, is receivable within the peripheral confines of the window and, upon rotation thereof into a second rotational orientation relative to the window, engages the periphery of the window with slots and flanges of the pairs of sides of the window and the latch handle engaging one another, respectively, to retain the latch handle in the window, the pairs of sides engaging one another in the second orientation of the latch handle relative to the window to enable sliding movement of the latch handle in at least one linear direction relative to the window.

In a further preferred embodiment according to the present invention, there is provided a control rod for a nuclear reactor comprising a control rod body having an elongated axis and a plurality of laterally projecting blades, the body having a generally rectangular window defined by upper and lower edges and opposite sides, the window lying along the axis, a generally rectangular latch handle for connection to the control rod body and location in the window, the latch handle having a pair of opposite sides, the opposite sides of one of the window and the latch handle having retaining slots and the opposite sides of another of the window and the latch handle having flanges for engaging in the slots, the latch handle and the window being configured so that the latch handle, in a first rotational orientation relative to the window, is receivable within the window with the latch handle sides lying generally in opposition to the upper and lower edges of the window and, upon rotation thereof into a second rotational orientation relative to the window, has the sides thereof engaging with the opposite sides of the window, respectively, with the slots and flanges engaging one another to retain the latch in the window, the opposite sides of the latch handle and the opposite sides of the window engaging one another in the second orientation of the latch handle to enable sliding movement of the latch handle in at least one linear direction relative to the window and along the axis.

In a still further preferred embodiment according to the present invention, there is provided a control rod for a nuclear reactor comprising a control rod body having a plurality of laterally projecting blades angularly related to one another, the body having a window with spaced edges, a latch handle for connection to the control rod body and location in the window, the latch handle having spaced edges, at least a pair of edges of one of the window and the latch handle having retaining slots and at least a pair of edges of another of the window and the latch handle having flanges for engaging in the slots, the edges of the latch handle and the window being configured so that the latch handle, in a first rotational orientation relative to the window, is receivable within the peripheral confines of the window and, upon rotation thereof into a second rotational orientation relative to the window, engages the periphery of the window with slots and flanges of the edges engaging one another, respectively, to retain the latch handle in the window, the slots and the flanges engaging one another in the second orientation of the latch handle relative to the window to enable sliding movement of the latch handle in at least one linear direction relative to the window.

Accordingly, it is the primary object of the present invention to provide a novel and improved latch handle for a control rod which is readily and easily mounted within the window of the control rod without welding and reduced labor.

BEST MODE FOR CARRYING OUT THE INVENTION

Figure 1:
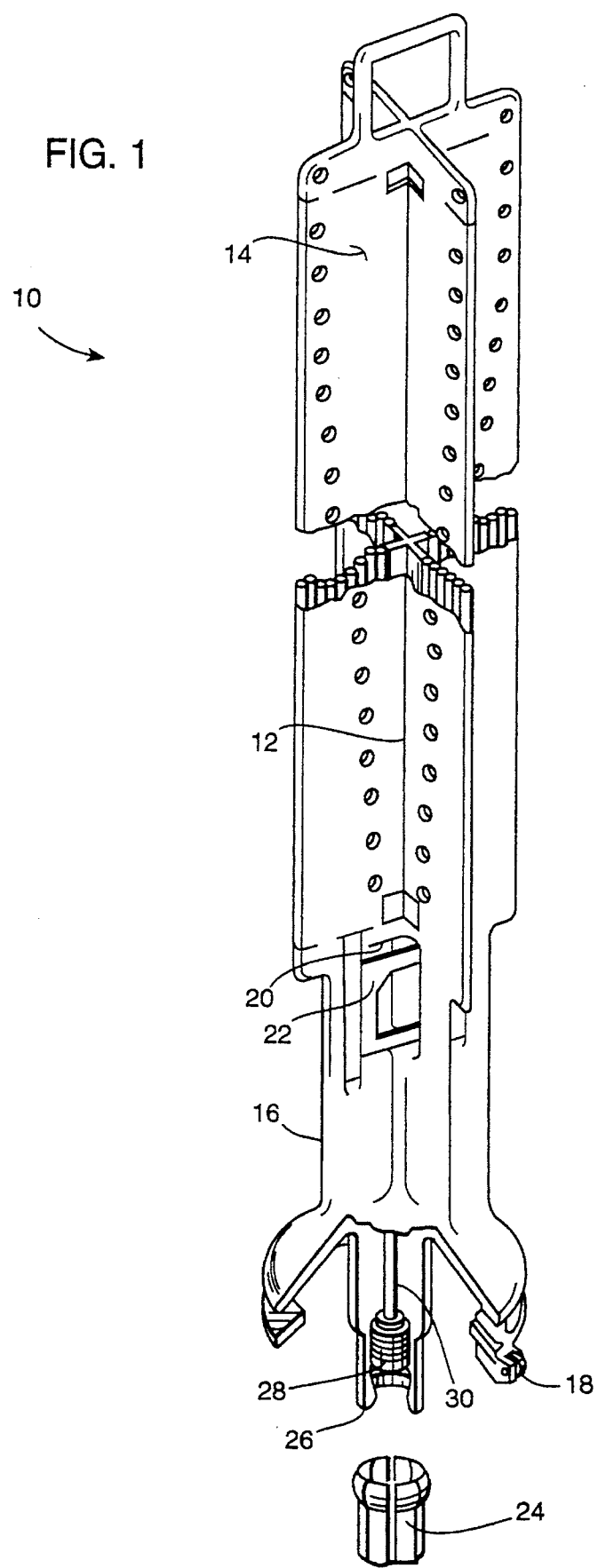
FIG. 1 is a fragmentary perspective view of a control rod according to the prior art.

Referring now to the drawings, particularly to FIG. 1, there is illustrated a control rod constructed in accordance with the prior art and generally designated 10. The control rod includes a control rod body 12 which is generally cruciform in cross section to define laterally projecting blades 14 disposed generally at right angles relative to one another. The blades contain neutron absorber rods for power distribution shaping and reactivity control in the nuclear reactor. The control rod body 12 also includes a velocity limiter 16, rollers 18 which facilitate removal and insertion of the control rod in the reactor vessel, and a window 20 for receiving a latch handle 22 for releasably attaching the control rod to a control rod drive. As will be appreciated, the control rod drive lies below the control rod and serves to raise and lower the control rod within the core of the nuclear reactor. The control rod drive terminates at its upper end in a coupling spud 24 which is releasably coupled in a conventional manner by a socket 26 and a lock plug 28 to latch handle 22 by way of a shaft 30. That is, the opposite ends of the shaft 30 carry the lock plug 28 and a connection to the latch handle 22, for example, a threaded nut and bolt arrangement. Thus, the control rod 10 may be detached from the control rod drive by raising the handle 22 which in turn raises the locking plug to release the coupling spud 24 from the socket 26, all as conventional.

Figure 2:
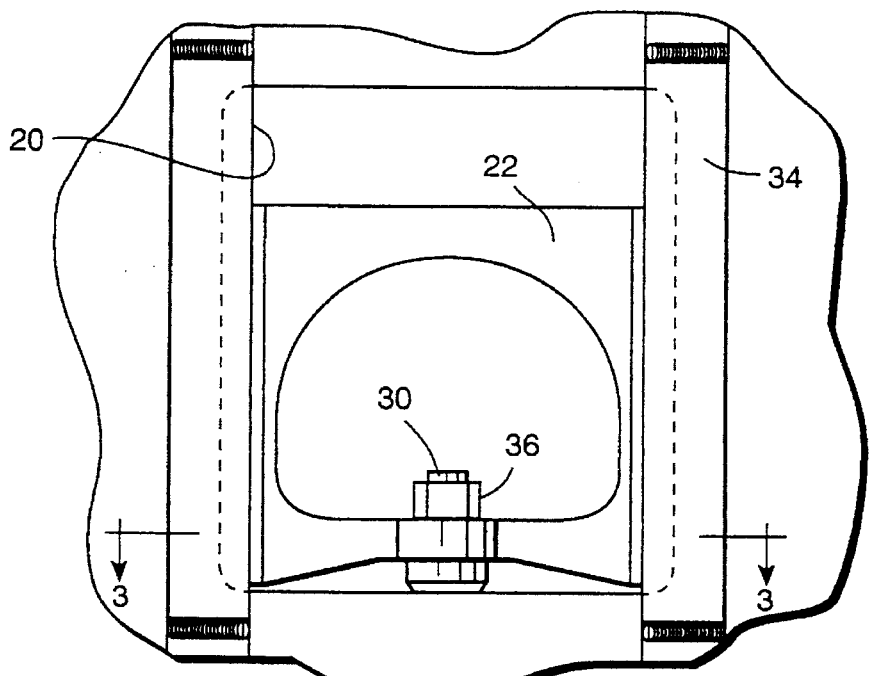
FIG. 2 is a fragmentary enlarged elevational view of the prior art window and latch handle of the control rod illustrated in FIG. 1.
Figure 3:
FIG. 3 is a cross-sectional view thereof, taken generally about on line 3—3 in FIG. 2.

Referring to FIGS. 2 and 3, the prior art latch handle 22 is generally rectangular in shape and has a pair of laterally projecting flanges 32. To capture the handle 22 within the window 20, elongated strips 34 are provided along the opposite faces of the window 22 and welded to the body of the control rod after the latch handle 22 has been inserted within the peripheral confines of the window. In this manner, the latch handle 22 is locked in the window and is enabled for vertical sliding movement within the window whereby the shaft 30 coupled to the latch handle 22 by a nut and threaded end of shaft 30 can be raised and lowered to operate the latching mechanism between the control rod and control rod drive.

Figure 4:
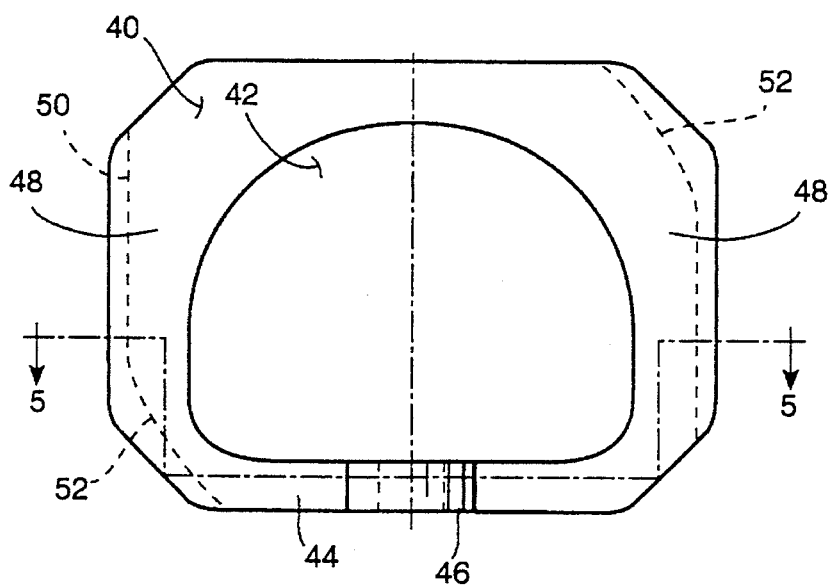
FIG. 4 is a side elevational view of a latch handle constructed in accordance with the present invention.
Figure 5:
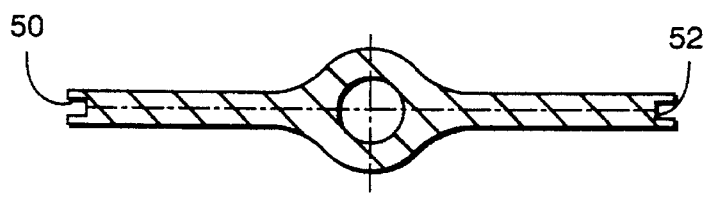
FIG. 5 is a cross-sectional view thereof, taken generally about on line 5—5 in FIG. 4.

The latch handle and window arrangement according to the present invention is illustrated in FIGS. 4–8. In FIG. 4, a latch handle 40 according to the present invention has a plurality of generally linearly extending sides. Particularly, latch handle 40 is generally rectangular in cross section with the corners removed. Handle 40 has a central opening 42 and the lower leg 44 of handle 40 mounts a laterally projecting hub 46 for receiving the threaded end of the shaft 30.

In a preferred form of the present invention, the opposite sides 48 of handle 40 are provided with marginal grooves. As illustrated in FIG. 4, the base 50 of each marginal groove extends linearly along each side 48 and has an end portion 52 which is curved or set back from any extension of the linear base 50. The set back or curved portions 52 on opposite sides of the handle lie diagonally opposite one another.

Figure 6:
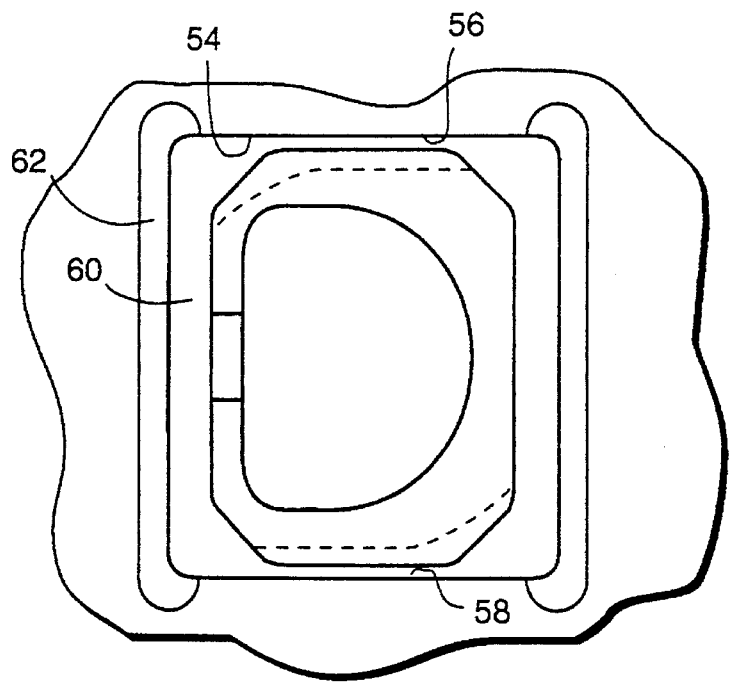
FIG. 6 is a fragmentary side elevational view of the latch handle of FIGS. 4 and 5 being disposed within the window of the control rod in a first angular orientation.
Figure 7:
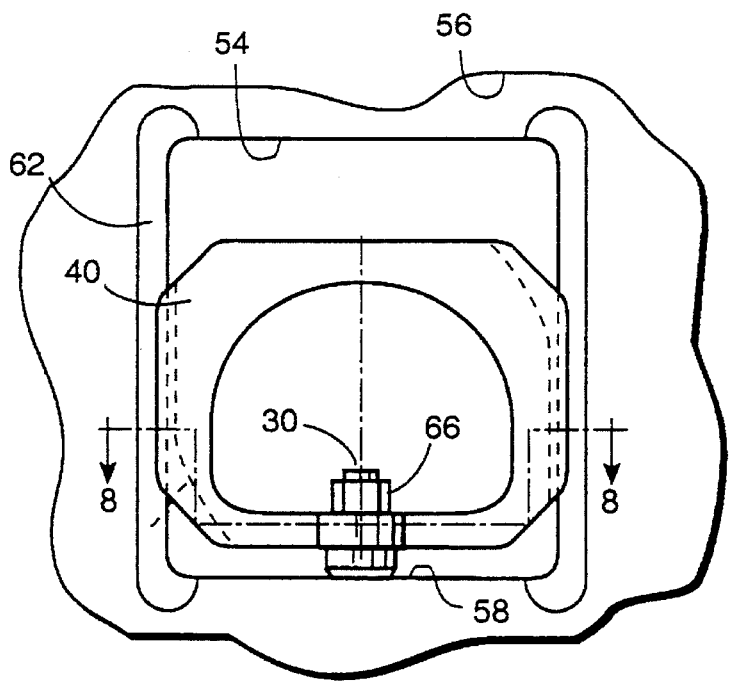
FIG. 7 is a view similar to FIG. 6 with the latch handle rotated into a second orientation and engaging the margins of the window.
Figure 8:
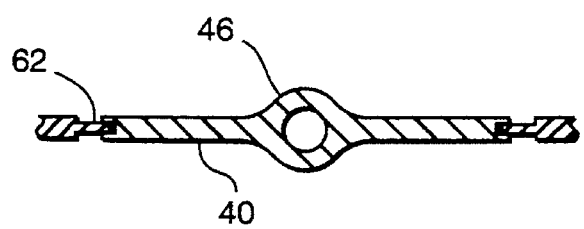
FIG. 8 is a cross-sectional view thereof, taken generally about on line 8—8 in FIG. 7.

Referring to FIG. 6, the opening 54 in the control rod has upper and lower edges 56 and 58, respectively, as well as side edges 60. The side edges 60 are formed to provide side flanges or tongues 62 opposite one another. As will be appreciated from a review of FIG. 6, the latch handle 40 is sized and configured in a first angular orientation to lie wholly within and spaced from the peripheral confines of the window 54. That is, as illustrated in FIG. 6, the opposite sides 48 of latch handle 40 lie in spaced opposition to the upper and lower edges 56 and 58, respectively, of window 54, while the upper and lower legs 55 and 57 of handle 40 lie in spaced opposition to opposite side edges 60 of window 54. Upon rotation of the latch handle 40 while within the peripheral confines of window 54 into a second angular orientation as illustrated in FIG. 7, the slots 50 in the sides 48 of the latch handle 40 receive the flanges 62 of the sides of the window 54. Consequently, upon rotation of the latch handle a full 90° between the angular orientations illustrated upon comparison of FIGS. 6 and 7, the flanges 62 are engaged in the slots 50 of the latch handle 40 thereby capturing the latch handle within the window. In the second angular orientation illustrated in FIG. 7, it will be appreciated that the latch handle is free for vertical sliding movement within the confines of the window 54. Once the latch handle has been oriented as illustrated in FIG. 7, the shaft 30 may be inserted through the opening in hub 46 and a nut 66 applied about the threaded end of the shaft to secure the latch handle and shaft to one another.

To facilitate the rotation of the latch handle between the two angular orientations illustrated in FIGS. 6 and 7, respectively, the bases 52 of the slots 50 are arcuate adjacent diagonally opposite end portions of the sides of the latch handle. This facilitates rotation of the latch handle so that the latch handle does not bind up along the margins of the window upon rotation from the first orientation (FIG. 6) to the second orientation (FIG. 7). It will also be appreciated from the foregoing that while slots are preferably provided in the sides of the latch handle and flanges along the opposite sides of the window, the slots and the flanges can be reversed with the slots lying along the opposite sides of the window and the flanges lying along opposite sides of the latch handle. The flanges in the latter configuration have curved end portions similarly as the bases 52 of the slots to facilitate rotation of the latch handle between its angular orientations illustrated in FIGS. 6 and 7, respectively.

Thus, it will be appreciated that the latch handle can be disposed within the window without welding strips to the control rod as in the prior art after the latch handle has been disposed in the window. This, of course, facilitates the construction and reduces the labor involved in applying the latch handle to the control rod. No additional elements need to be attached to the window or the latch handle to provide for capture of the latch handle within the window while still providing for vertical linear sliding movement of the latch handle along the window. Note also that the latch handle can be removed without any deleterious effects on the major components of the control rod.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control rod for a nuclear reactor comprising:

a control rod body having a plurality of blades projecting generally at right angles to one another, said body having a window defined by a plurality of generally linearly extending sides;

a latch handle for connection to said control rod body and location in said window, said latch handle having a plurality of linearly extending sides, at least a pair of sides of one of said window and said latch handle having retaining slots and at least a pair of sides of another of said window and said latch handle having flanges for engaging in said slots;

the sides of said latch handle and said window being configured so that said latch handle, in a first rotational orientation relative to said window, is receivable within the peripheral confines of said window and, upon rotation thereof into a second rotational orientation relative to said window, engages the periphery of said window with slots and flanges of said pairs of sides of said window and said latch handle engaging one another, respectively, to retain said latch handle in said window;

said pairs of sides engaging one another in said second orientation of said latch handle relative to said window to enable sliding movement of said latch handle in at least one linear direction relative to said window.

2. A control rod according to claim 1 wherein said control rod body includes a shaft having an axis and coupled to said latch handle in said second orientation thereof for linear movement therewith in an axial direction of said shaft.

3. A control rod according to claim 2 wherein said latch handle has an opening for receiving said shaft when in said second orientation, a locking device for connecting said shaft and said latch handle to one another in said second orientation of said latch handle relative to said window.

4. A control rod according to claim 1 wherein said latch has a pair of flanges defining said slots on each of said pair of sides of said latch handle, said window having a flange on each of said pair of sides of said window for engaging in said slots.

5. A control rod according to claim 1 wherein said window and said latch handle are generally rectangular in configuration.

6. A control rod according to claim 1 wherein portions of the slots or flanges of one of said pairs of slots and said flanges are arcuate to enable rotation of said latch handle between said first and second rotational orientations.

7. A control rod according to claim 1 wherein said windows and said latch handle are generally rectangular in configuration and wherein portions of the slots or flanges of one of said pairs of slots and said flanges are arcuate to enable rotation of said latch handle between said first and second rotational orientations, the arcuate slots or flanges lying along opposite sides of said latch handle or said window.

8. A control rod for a nuclear reactor comprising:

a control rod body having an elongated axis and a plurality of laterally projecting blades, said body having a generally rectangular window defined by upper and lower edges and opposite sides, said window lying along said axis;

a generally rectangular latch handle for connection to said control rod body and location in said window, said latch handle having a pair of opposite sides, said opposite sides of one of said window and said latch handle having retaining slots and said opposite sides of another of said window and said latch handle having flanges for engaging in said slots;

said latch handle and said window being configured so that said latch handle, in a first rotational orientation relative to said window, is receivable within said window with said latch handle sides lying generally in opposition to said upper and lower edges of said window and, upon rotation thereof into a second rotational orientation relative to said window, has said sides thereof engaging with the opposite sides of said window, respectively, with said slots and flanges engaging one another to retain said latch in said window, said opposite sides of said latch handle and said opposite sides of said window engaging one another in said second orientation of said latch handle to enable sliding movement of said latch handle in at least one linear direction relative to said window and along said axis.

9. A control rod according to claim 8 wherein said control rod body includes a shaft having an axis and coupled to said latch handle in said second orientation thereof for linear movement therewith in the axial direction of said shaft.

10. A control rod according to claim 9 wherein said latch handle has an opening for receiving said shaft when in said second orientation, a locking device for connecting said shaft and said latch handle to one another in said second orientation of said latch handle relative to said window.

11. A control rod according to claim 8 wherein said opposite sides of said latch handle have set back portions along end portions thereof generally diagonally opposite one another.

12. A control rod according to claim 8 wherein said latch handle has slots along said opposite sides thereof and said window has said flanges along said opposite sides thereof.

13. A control rod according to claim 12 wherein bases of said slots of said latch handle are set back along end portions of said opposite sides generally diagonally opposite one another to enable said latch handle for rotation from said first orientation to said second orientation.

14. A control rod according to claim 13 wherein said control rod body includes a shaft having an axis and coupled to said latch handle in said second orientation thereof for linear movement therewith in an axial direction of said shaft; and wherein said latch handle has an opening for receiving said shaft when in said second orientation, a locking device for connecting said shaft in said latch handle to one another in said second orientation of said latch handle relative to said window.

15. A control rod for a nuclear reactor comprising:

a control rod body having a plurality of laterally projecting blades angularly related to one another, said body having a window with spaced edges;

a latch handle for connection to said control rod body and location in said window, said latch handle having spaced edges, at least a pair of edges of one of said window and said latch handle having retaining slots and at least a pair of edges of another of said window and said latch handle having flanges for engaging in said slots;

the edges of said latch handle and said window being configured so that said latch handle, in a first rotational orientation relative to said window, is receivable within the peripheral confines of said window and, upon rotation thereof into a second rotational orientation relative to said window, engages the periphery of said window with slots and flanges of said edges engaging one another, respectively, to retain said latch handle in said window;

said slots and said flanges engaging one another in said second orientation of said latch handle relative to said window to enable sliding movement of said latch handle in at least one linear direction relative to said window.

16. A control rod according to claim 15 wherein said control rod body includes a shaft having an axis and coupled to said latch handle in said second orientation thereof for linear movement therewith in an axial direction of said shaft.

17. A control rod according to claim 16 wherein said latch handle has an opening for receiving said shaft when in said second orientation, a locking device for connecting said shaft and said latch handle to one another in said second orientation of said latch handle relative to said window.

18. A control rod according to claim 15 wherein the slots or flanges of one of said pairs of edges and said flanges are arcuate to enable rotation of said latch handle between said first and second rotational orientations.

19. A control rod according to claim 15 wherein said windows and said latch handle are generally rectangular in configuration and wherein the slots or flanges of one of said pairs of edges and said flanges are arcuate to enable rotation of said latch handle between said first and second rotational orientations, the arcuate slots or flanges lying along opposite edges of said latch handle or said window.

* * * * *